(12) United States Patent
Arora et al.

(10) Patent No.: US 12,041,134 B1
(45) Date of Patent: Jul. 16, 2024

(54) SYSTEM AND METHOD FOR REPLICATION AND TRANSMISSION OF CRITICAL DATA USING ULTRA RELIABLE LOW LATENCY COMMUNICATION NETWORK ARCHITECTURE

(71) Applicant: BANK OF AMERICA CORPORATION, Charlotte, NC (US)

(72) Inventors: Saurabh Arora, Gurugram (IN); Sandeep Kumar Chauhan, Hyderabad (IN); Bhagya Lakshmi Sudha Lavanya Mallidi, Hyderabad (IN); Puneetha Polasa, Telangana (IN); Sanchit Taggar, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/133,128

(22) Filed: Apr. 11, 2023

(51) Int. Cl.
 *H04L 67/133* (2022.01)
 *H04L 67/60* (2022.01)

(52) U.S. Cl.
 CPC ............ *H04L 67/133* (2022.05); *H04L 67/60* (2022.05)

(58) Field of Classification Search
 CPC .............................. H04L 67/133; H04L 67/60
 See application file for complete search history.

(56) References Cited

U.S. PATENT DOCUMENTS

| | | | |
|---|---|---|---|
| 9,769,140 B1 * | 9/2017 | Asveren | H04L 67/14 |
| 10,645,528 B2 | 5/2020 | Vrzic | |
| 10,778,779 B2 | 9/2020 | Vrzic et al. | |
| 10,791,568 B2 * | 9/2020 | Baldemair | H04W 72/569 |
| 11,128,404 B2 | 9/2021 | Yilmaz et al. | |
| 11,190,231 B1 | 11/2021 | Wang et al. | |
| 11,489,646 B2 | 11/2022 | Jiang et al. | |
| 11,737,169 B2 | 5/2023 | Kalkunte et al. | |
| 11,765,706 B2 | 9/2023 | Hohne et al. | |
| 11,895,238 B1 * | 2/2024 | Blasius | H04L 63/1416 |
| 2006/0018327 A1 * | 1/2006 | Brueckner | H04L 12/6418 370/400 |
| 2013/0024688 A1 * | 1/2013 | Wen | H04L 65/1104 713/168 |
| 2017/0086049 A1 * | 3/2017 | Vrzic | H04W 36/18 |
| 2018/0042042 A1 | 2/2018 | Li et al. | |
| 2018/0052967 A1 * | 2/2018 | Boomershine | G16H 20/00 |
| 2019/0124070 A1 * | 4/2019 | Engan | H04L 9/3247 |
| 2019/0268267 A1 * | 8/2019 | Pignataro | H04L 45/741 |
| 2019/0312733 A1 * | 10/2019 | Engan | H04L 63/126 |

(Continued)

*Primary Examiner* — Brian J. Gillis
*Assistant Examiner* — Thao D Duong
(74) *Attorney, Agent, or Firm* — Moore & Van Allen PLLC; Nicholas C. Russell (57) ABSTRACT

Embodiments of the present invention provide a system for replication and transmission of critical data using ultra reliable low latency communication network architecture. The system is configured for determining initiation of a real-time request from one or more channels to one or more receiving applications, determining that the real-time request does not comprise a criticality header, generating the criticality header for the real-time request, determining if the real-time request is eligible for transmission via an ultra-reliable low latency communication network, and transmitting the real-time request to a cluster of servers based on determining if the real-time request is eligible for transmission via an ultra-reliable low latency communication network.

20 Claims, 6 Drawing Sheets

(56) References Cited

U.S. PATENT DOCUMENTS

| | | | |
|---|---|---|---|
| 2021/0306902 A1* | 9/2021 | Williams | H04W 80/02 |
| 2022/0077971 A1 | 3/2022 | Nammi et al. | |
| 2022/0350724 A1* | 11/2022 | Kumar KN | G06F 11/3452 |
| 2022/0394795 A1 | 12/2022 | Kim et al. | |
| 2022/0400503 A1 | 12/2022 | Cavalcanti et al. | |
| 2022/0417793 A1 | 12/2022 | Kim et al. | |
| 2023/0028874 A1* | 1/2023 | Fang | H04W 72/53 |
| 2023/0046967 A1 | 2/2023 | Ko et al. | |
| 2023/0136286 A1 | 5/2023 | Gao et al. | |
| 2024/0146986 A1* | 5/2024 | Alvarez | H04N 21/25816 |

\* cited by examiner

SYSTEM AND METHOD FOR REPLICATION AND TRANSMISSION OF CRITICAL DATA USING ULTRA RELIABLE LOW LATENCY COMMUNICATION NETWORK ARCHITECTURE

BACKGROUND

There exists a need for a system for replication and transmission of critical data using ultra reliable low latency communication network architecture.

BRIEF SUMMARY

Embodiments of the present invention address the above needs and/or achieve other advantages by providing apparatuses (e.g., a system, computer program product and/or other devices) and methods for replication and transmission of critical data using ultra reliable low latency communication network architecture. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines initiation of a real-time request from one or more channels to one or more receiving applications, determines that the real-time request does not comprise a criticality header, generates the criticality header for the real-time request, determines if the real-time request is eligible for transmission via an ultra-reliable low latency communication network, and transmits the real-time request to a cluster of servers based on determining if the real-time request is eligible for transmission via an ultra-reliable low latency communication network.

In some embodiments, the present invention determines that the real-time request is eligible for transmission via the ultra-reliable low latency communication network and transmits the real-time request via the ultra-reliable low latency communication network.

In some embodiments, the present invention determines that the real-time request is not eligible for transmission via the ultra-reliable low latency communication network and transmits the real-time request via a standard entity network comprising a standard replication and transmission mechanism.

In some embodiments, the cluster of servers comprise active cluster of servers.

In some embodiments, the cluster of servers comprise active cluster of servers and inactive cluster of servers, wherein the inactive cluster of servers are back up servers to the active cluster of servers.

In some embodiments, the present invention determines that the real-time request comprises the criticality header; and processes the real-time request based on the criticality header.

In some embodiments, the real-time request is an API call.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "entity" may include any organization that processes requests from multiple channels. Furthermore, embodiments of the present invention use the term "user." It will be appreciated by someone with ordinary skill in the art that the user may be an employee of the entity. In an embodiment of the present invention, the entity may be a financial institution. In some embodiments of the present invention, the entity may be a non-financial institution. In some embodiments, a user may be an employee (e.g., application developer, analyst, human resources specialist, and/or the like) of the entity. In some embodiments, the user may be a customer of the entity. In some embodiments, the user may be a potential customer of the entity.

Typically, entities use a large number of applications to perform one or more organizational activities. Number of applications utilized by the entity and number of users who utilize these application may increase over a period of time. To accommodate throughput of requests associated with the applications and users, entities opt for multiple cluster of servers with immense processing power. However by doing so, data needs to be replicated to all of the clusters of servers when a real-time change occurs, which can be time consuming and can result in latency issues. Replication of critical data may be delayed due to latency, thereby causing failure of applications and/or hinderance to critical organizational activities associated with the entity. As such, there exists a need for a system that overcomes these technical problems.

Figure 1:
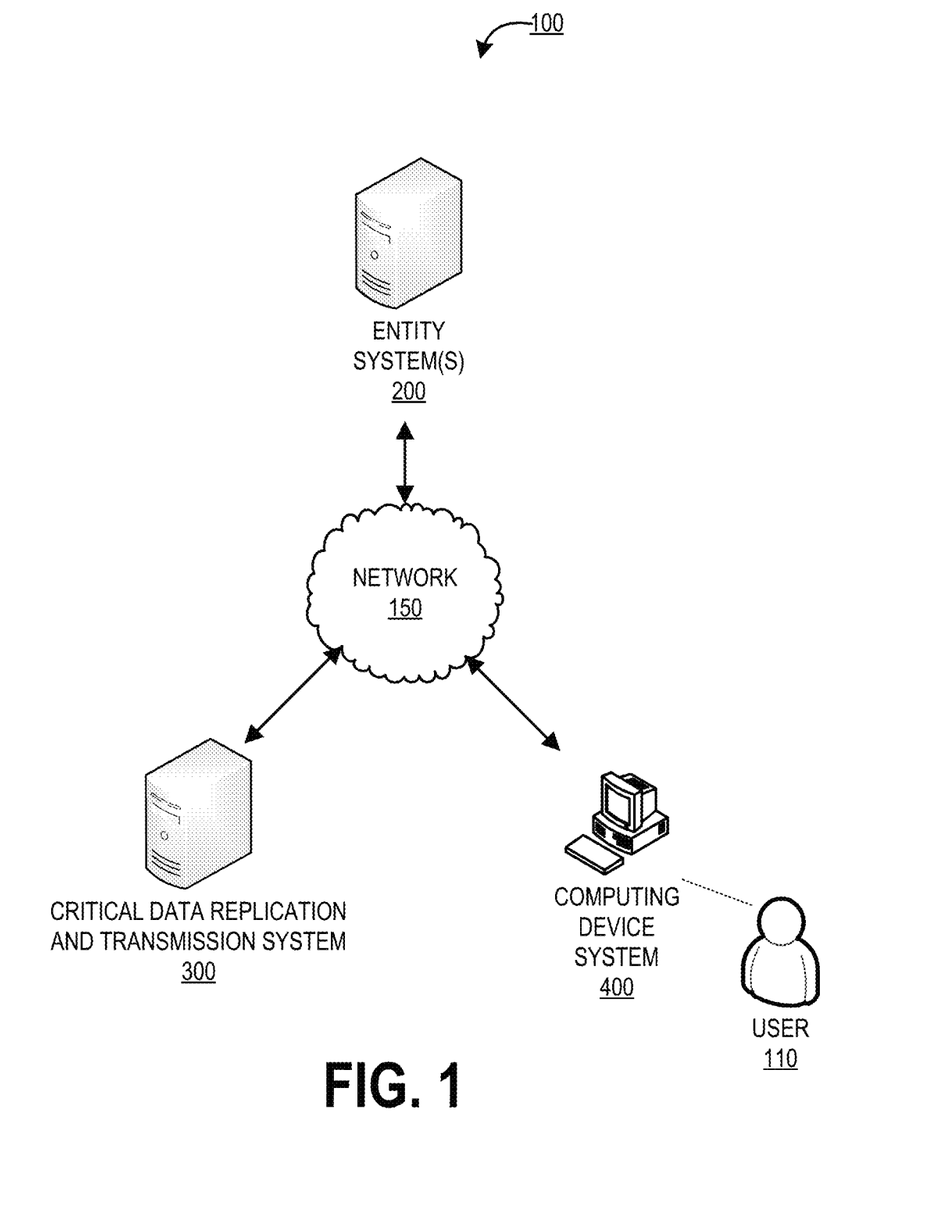
FIG. 1 provides a block diagram illustrating a system environment for replication and transmission of critical data using ultra reliable low latency communication network architecture, in accordance with an embodiment of the invention.

FIG. 1 provides a block diagram illustrating a system environment 100 for replication and transmission of critical data using ultra reliable low latency communication network architecture, in accordance with an embodiment of the invention. As illustrated in FIG. 1, the environment 100 includes a critical data replication and transmission system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution.

The critical data replication and transmission system 300 is a system of the present invention for performing one or more process steps described herein. In some embodiments, the critical data replication and transmission system 300 may be an independent system. In some embodiments, the critical data replication and transmission system 300 may be a part of the entity system 200.

The critical data replication and transmission system 300, the entity system 200, the computing device system 400, and/or the client system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the critical data replication and transmission system 300 is configured to communicate information or instructions with the entity system 200, the computing device system 400, and/or the client system 201 across the network 150.

The computing device system 400 may be a computing device of the user 110. In general, the computing device system 400 communicates with the user 110 via a user interface of the computing device system 400, and in turn is configured to communicate information or instructions with the critical data replication and transmission system 300, entity system 200, and/or the client system 201 across the network 150.

Figure 2:
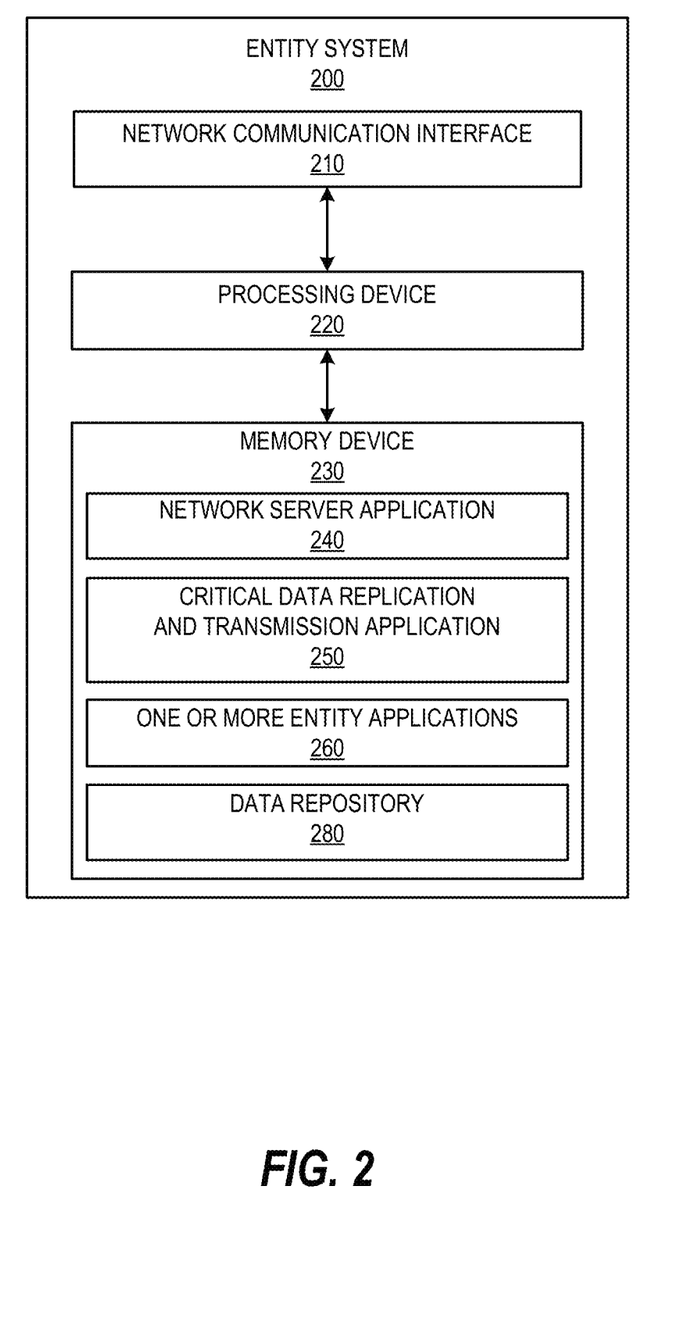
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In some embodiments, the entity system 200 may be operated by any entity that develops software applications. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a critical data replication and transmission application 250, one or more entity applications 260, and a data repository 280. The computer-executable program code of the network server application 240, the critical data replication and transmission application 250, and the one or more entity applications 260 to perform certain logic, data-extraction, and data-storing functions of the entity system 200 described herein, as well as communication functions of the entity system 200.

The network server application 240, the critical data replication and transmission application 250 and the one or more entity applications 260 are configured to store data in the data repository 280 or to use the data stored in the data repository 280 when communicating through the network communication interface 210 with the critical data replication and transmission system 300, and the computing device system 400 to perform one or more process steps described herein. In some embodiments, the entity system 200 may receive instructions from the critical data replication and transmission system 300 via the critical data replication and transmission application 250 to perform certain operations. The critical data replication and transmission application 250 may be provided by the critical data replication and transmission system 300.

Figure 3:
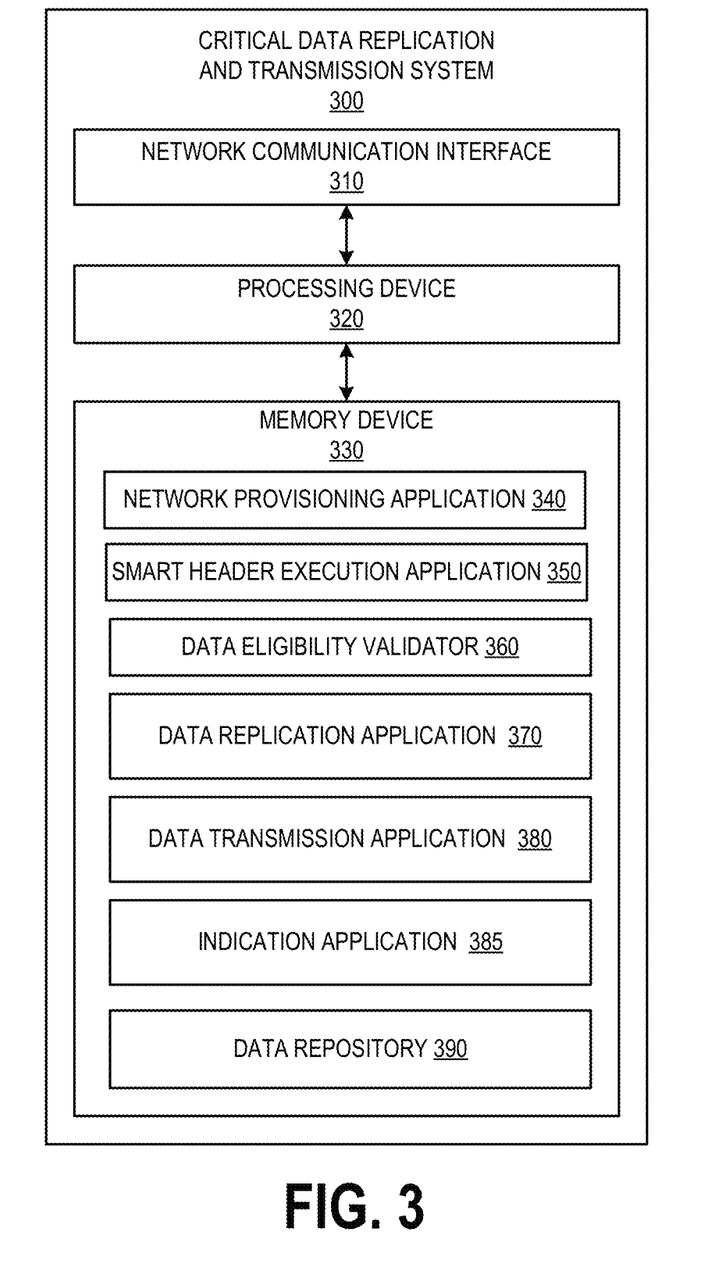
FIG. 3 provides a block diagram illustrating a critical data replication and transmission system 300 of FIG. 1, in accordance with an embodiment of the invention.

FIG. 3 provides a block diagram illustrating the critical data replication and transmission system 300 in greater detail, in accordance with embodiments of the invention. As illustrated in FIG. 3, in one embodiment of the invention, the critical data replication and transmission system 300 includes one or more processing devices 320 operatively coupled to a network communication interface 310 and a memory device 330. In certain embodiments, the critical data replication and transmission system 300 is operated by a first entity, such as a financial institution, while in other embodiments, the critical data replication and transmission system 300 is operated by an entity other than a financial institution. In some embodiments, the critical data replication and transmission system 300 is owned or operated by the entity of the entity system 200. In some embodiments, the critical data replication and transmission system 300 may be an independent system. In alternate embodiments, the critical data replication and transmission system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the critical data replication and transmission system 300 described herein. For example, in one embodiment of the critical data replication and transmission system 300, the memory device 330 includes, but is not limited to, a network provisioning application 340, a smart header execution application 350, a data eligibility validator 360, data replication application 370, a data transmission application 380, indication application 385, and a data repository 390 comprising data processed or accessed by one or more applications in the memory device 330. The computer-executable program code of the network provisioning application 340, the smart header execution application 350, the data eligibility validator 360, the data replication application 370, the data transmission application 380, and the indication application 385 may instruct the processing device 320 to perform certain logic, data-processing, and data-storing functions of the critical data replication and transmission system 300 described herein, as well as communication functions of the critical data replication and transmission system 300.

The network provisioning application 340, the smart header execution application 350, the data eligibility validator 360, the data replication application 370, the data transmission application 380, and the indication application 385 are configured to invoke or use the data in the data repository 390 when communicating through the network communication interface 310 with the entity system 200, and the computing device system 400. In some embodiments, the network provisioning application 340, the smart header execution application 350, the data eligibility validator 360, the data replication application 370, the data transmission application 380, and the indication application 385 may store the data extracted or received from the entity system 200 and the computing device system 400 in the data repository 390. In some embodiments, the network provisioning application 340, the smart header execution application 350, the data eligibility validator 360, the data replication application 370, the data transmission application 380, and the indication application 385 may be a part of a single application. One or more processes performed by the smart header execution application 350, the data eligibility validator 360, the data replication application 370, the data transmission application 380, and the indication application 385 are described in FIG. 5.

Figure 4:
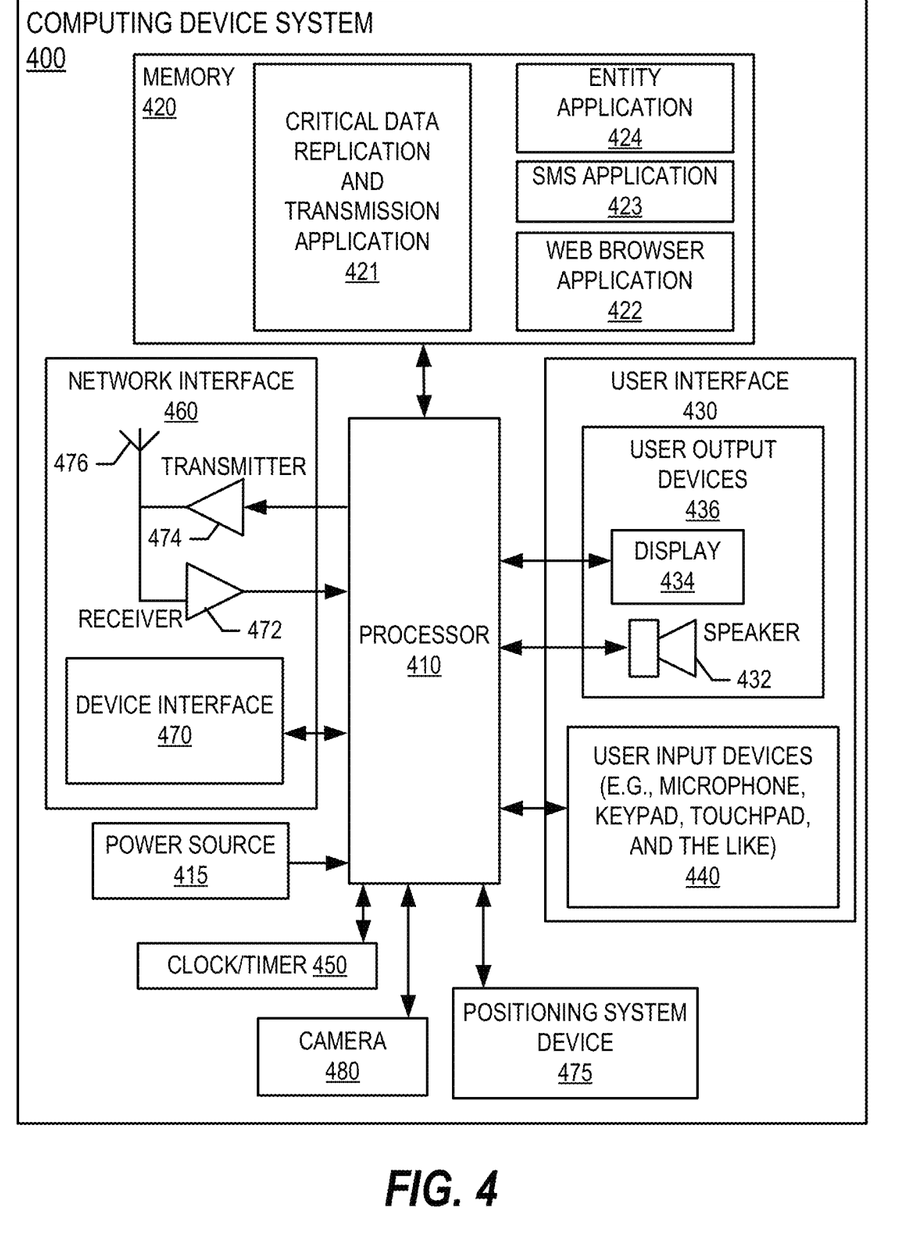
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a critical data replication and transmission application 421, an entity application 424, or the like. These applications also typically instructions to a graphical user interface (GUI) on the display 430 that allows the user 110 to interact with the entity system 200, the critical data replication and transmission system 300, and/or other devices or systems. The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
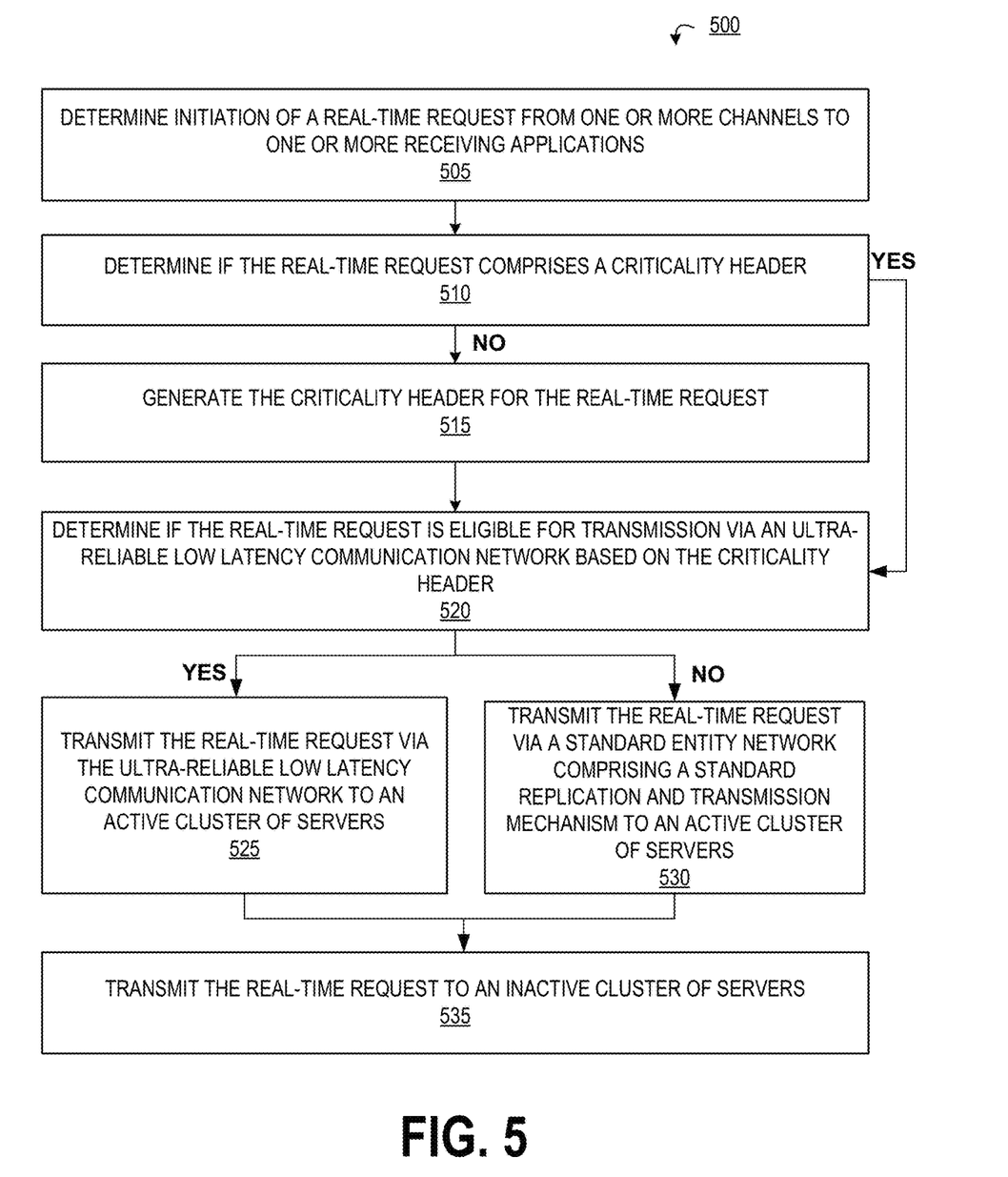
FIG. 5 provides a process flow for replication and transmission of critical data using ultra reliable low latency communication network architecture, in accordance with an embodiment of the invention.

FIG. 5 provides a process flow for replication and transmission of critical data using ultra reliable low latency communication network architecture, in accordance with an embodiment of the invention. As shown in block 505, the system determines initiation of a real-time request from one or more channels to one or more receiving applications. In some embodiments, the real-time request may be an API call initiated by a user associated with an entity. In one example, the real-time request may be a request from a customer of a financial institution to view a balance associated with a checking account. In another example, the real-time request may be a request from a customer of a financial institution to conduct a transaction. In yet another example, the real-time request may be a request from an employee associated with the entity to deploy a software code to a real-time production environment. In some embodiments, the real-time request may be a read operation, where entity systems process the real-time request to display the data to the user who initiated the request. In some embodiments, the real-time request may be a write operation, where entity systems process the real-time request to make changes to the entity systems, data repositories of the entity systems, or the like. In some embodiments, the one or more channels may be any channels provided by the entity to the users to submit the real-time requests. Examples of the one or more channels may include, but are not limited to, email, web, mobile, Interactive Voice Response (IVR), and/or the like. In some embodiments, the one or more channels may be applications provided by the entity to the users of the entity. In some embodiments, the one or more receiving applications may be any entity applications (e.g., one or more entity application 260) that process the real-time requests submitted by the users. Examples of the one or more receiving applications may include payment processing applications, deployment applications, or the like.

As shown in block 510, the system determines if the real-time request comprises a criticality header. In some embodiments, the real-time request may comprise authorization headers, tokens, authentication headers, and/or the like along with the criticality header. The criticality header may define how critical the real-time request is. In some embodiments, the system may embed an executable program code in each of the one or more channels, where the executable program code generates the criticality header. In such embodiments, the criticality header generated by the executable program code may be static and may be configured at application level or function level associated with the applications. For example, the system may set criticality of all write operations as highly critical. In another example, the system may set criticality of all read operations as non-critical. In yet another example, the system may set only some operations of the applications as critical, where some write operations be set as non-critical.

If the system determines that the real-time request does not comprise the criticality header, the process flow proceeds to block 515. As shown in block 515, the system generates the criticality header for the real-time request. The system may generate the criticality header dynamically based on one or more contextual factors associated with the real-time request. For example, the system may set criticality of a transaction to a general recipient as non-critical while setting criticality of a transaction towards a payment of tuition as critical. It should be understood that the examples described herein are for explanatory purposes only and in no way delineate the scope of the invention. In some embodiments, the system may comprise an artificial intelligence engine that generates the criticality headers. In some embodiments, the artificial intelligence engine may learn from predefined conditions, user inputs, and/or the like and may use that learning while generating the criticality headers dynamically.

If the system determines that the real-time request comprises the criticality header, the process flow proceeds to block 520. As shown in block 520, the system determines if the real-time request is eligible for transmission via an ultra-reliable low latency communication network based on the criticality header. Based on the information in the criticality header, the system may determine whether the real-time request qualifies for transmission via the ultra-reliable low latency communication network.

In one embodiment, where the system determines that the real-time request is eligible for transmission via the ultra-reliable low latency communication network, the process flow proceeds to block 525. As shown in block 525, the system transmits the real-time request via the ultra-reliable low latency communication network to an active cluster of servers. In some embodiments, there may be special hardware in communication with the system of the invention that supports low latency transmissions and/or replication of data associated with the real-time requests. The active cluster of servers may comprise one or more nodes that may work together to process the real-time requests at a faster rate.

In one embodiment, where the system determines that the real-time request is not eligible for transmission via the ultra-reliable low latency communication network, the process flow proceeds to block 530. As shown in block 530, the system transmits the real-time request via a standard entity network comprising a standard replication and transmission mechanism to an active cluster of servers. The standard entity network comprising the standard replication and transmission mechanism may have latency issues. As such, non-critical requests are directed to the standard entity network.

As shown in block 535, the system transmits the real-time request to an inactive cluster of servers. The inactive cluster of servers may act as back up to the active cluster of servers. In case of failure of active cluster of servers, the inactive cluster of servers may take over the processing operations of the active cluster of servers. After transmitting the real-time request to the active cluster of servers, the system also transmits the real-time request to the inactive cluster of servers at a later time period. In some embodiments, the system may transmit all the real-time requests received by the active cluster of servers to the inactive cluster of servers at regular predefined intervals.

Figure 6:
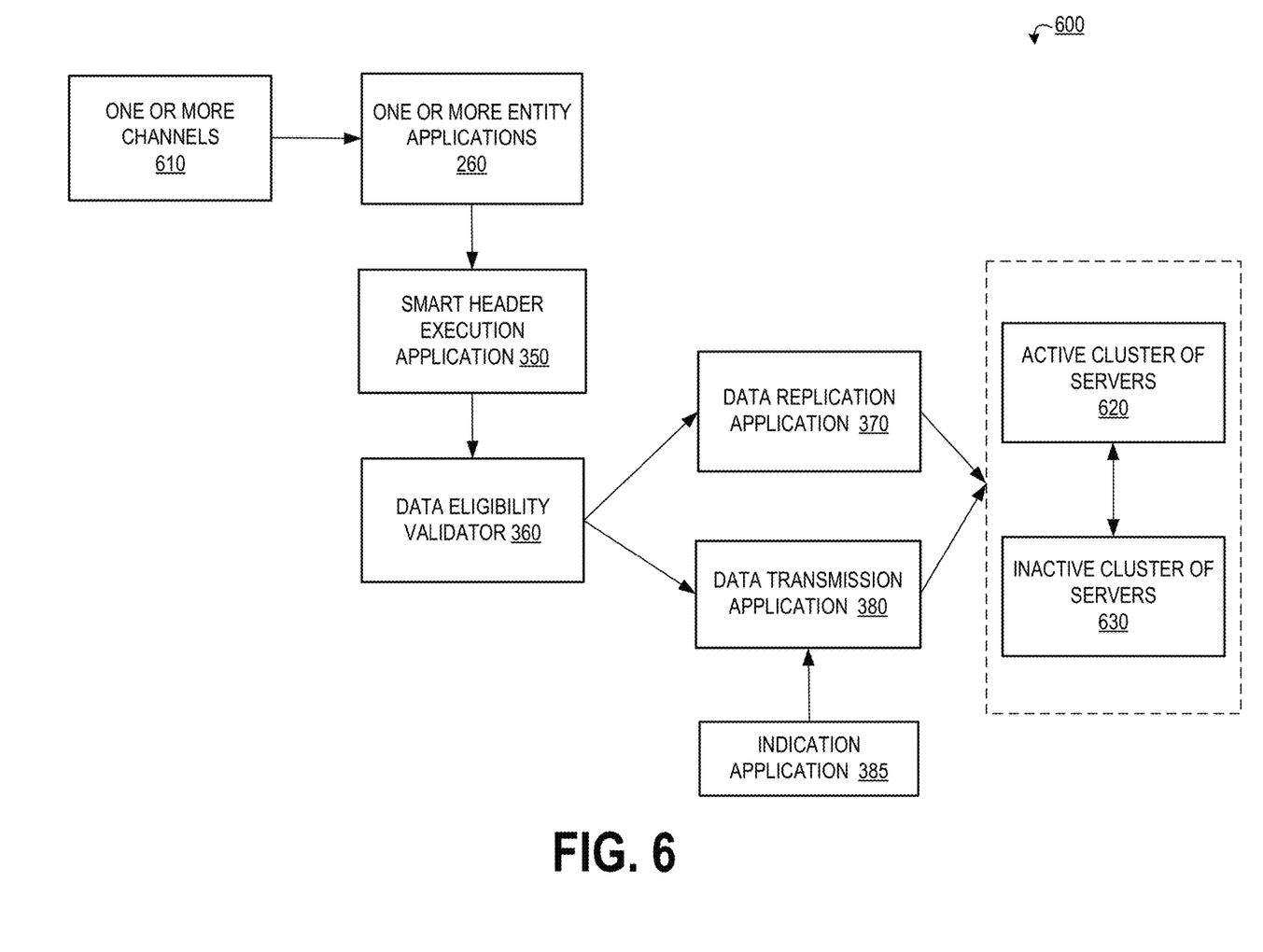
FIG. 6 provides a block diagram illustrating the process of replication and transmission of critical data using ultra reliable low latency communication network architecture, in accordance with an embodiment of the invention.

FIG. 6 provides a block diagram illustrating the process of replication and transmission of critical data using ultra reliable low latency communication network architecture, in accordance with an embodiment of the invention. As shown, one or more users 110 associated with the entity may initiate real-time requests via one or more channels 610, where the real-time requests are received by the one or more entity applications 260. In some embodiments, the one or more channels may comprise executable program codes that generate criticality headers based on predefined criteria. In some embodiments, where the criticality headers are not generated during origination and transmission of real-time requests, the smart header execution application 350 may generate the criticality header dynamically. In some embodiments, the smart header execution application 350 may comprise an artificial intelligence engine. The real-time request is then validated by the data eligibility validator 360 to determine whether the real-time time request qualifies for transmission and/or replication via the ultra-reliable low latency communication network architecture based on the information in the criticality header embedded in the real-time request. In one case, where the system determines that the real-time time request qualifies for transmission and/or replication via the ultra-reliable low latency communication network architecture, the real-time request is routed to the data transmission application 380, where the data transmission application 380 communicates with the special infrastructure that facilitates ultra-reliable low latency transmission to transmit the real-time request to a cluster of servers which comprise active cluster of servers 620 and/or inactive cluster of servers 630. The indication application 385 may identify criticality factors associated with the real-time request and may transmit the criticality indicators to the data transmission application 380, where the data transmission application 380 transmits the real-time request based on the criticality indicators. In some embodiments, the criticality indicators identified by the indication application 385 are also utilized by the cluster of servers while processing the real-time request. In another case, where the system determines that the real-time request does not qualify for transmission and/or replication via the ultra-reliable low latency communication network architecture, the real-time request is routed to the data replication application 370, where the real-time request is transmitted in order which it is received.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for replication and transmission of critical data using ultra reliable low latency communication network architecture, comprising:
    at least one processing device;
    at least one memory device; and
    a module stored in the at least one memory device comprising executable instructions that when executed by the at least one processing device, cause the at least one processing device to:
        determine initiation of a real-time request from one or more channels to one or more receiving applications, wherein the real-time request comprises authorization headers, tokens, and authentication headers;
        determine that the real-time request does not comprise a criticality header;
        dynamically generate the criticality header for the real-time request based on one or more contextual factors associated with the real-time request;
        embed the criticality header into the real-time request with the authorization headers, the tokens, and the authentication headers;
        determine if the real-time request is eligible for transmission via an ultra-reliable low latency communication network; and
        transmit the real-time request to a cluster of servers associated with the one or more receiving applications based on determining if the real-time request is eligible for transmission via an ultra-reliable low latency communication network.

2. The system according to claim 1, wherein the executable instructions cause the at least one processing device to:
    determine that the real-time request is eligible for transmission via the ultra-reliable low latency communication network; and
    transmit the real-time request via the ultra-reliable low latency communication network.

3. The system according to claim 1, wherein the executable instructions cause the at least one processing device to:

determine that the real-time request is not eligible for transmission via the ultra-reliable low latency communication network; and transmit the real-time request via a standard entity network comprising a standard replication and transmission mechanism.

4. The system according to claim 1, wherein the cluster of servers comprise active cluster of servers.

5. The system according to claim 1, wherein the cluster of servers comprise active cluster of servers and inactive cluster of servers, wherein the inactive cluster of servers are back up servers to the active cluster of servers.

6. The system according to claim 1, wherein the executable instructions cause the at least one processing device to:
determine that the real-time request comprises the criticality header; and
process the real-time request based on the criticality header.

7. The system according to claim 1, wherein the real-time request is an API call.

8. A computer program product for replication and transmission of critical data using ultra reliable low latency communication network architecture, comprising a non-transitory computer-readable storage medium having computer-executable instructions for:
determining initiation of a real-time request from one or more channels to one or more receiving applications, wherein the real-time request comprises authorization headers, tokens, and authentication headers;
determining that the real-time request does not comprise a criticality header;
dynamically generating the criticality header for the real-time request based on one or more contextual factors associated with the real-time request;
embedding the criticality header into the real-time request with the authorization headers, the tokens, and the authentication headers;
determining if the real-time request is eligible for transmission via an ultra-reliable low latency communication network; and
transmitting the real-time request to a cluster of servers associated with the one or more receiving applications based on determining if the real-time request is eligible for transmission via an ultra-reliable low latency communication network.

9. The computer program product according to claim 8, wherein the non-transitory computer-readable storage medium comprises computer-executable instructions for:
determining that the real-time request is eligible for transmission via the ultra-reliable low latency communication network; and
transmitting the real-time request via the ultra-reliable low latency communication network.

10. The computer program product according to claim 8, wherein the non-transitory computer-readable storage medium comprises computer-executable instructions for:
determining that the real-time request is not eligible for transmission via the ultra-reliable low latency communication network; and
transmitting the real-time request via a standard entity network comprising a standard replication and transmission mechanism.

11. The computer program product according to claim 8, wherein the cluster of servers comprise active cluster of servers.

12. The computer program product according to claim 8, wherein the cluster of servers comprise active cluster of servers and inactive cluster of servers, wherein the inactive cluster of servers are back up servers to the active cluster of servers.

13. The computer program product according to claim 8, wherein the real-time request is an API call.

14. The computer program product according to claim 8, wherein the non-transitory computer-readable storage medium comprises computer-executable instructions for:
determining that the real-time request comprises the criticality header; and
processing the real-time request based on the criticality header.

15. A computerized method for replication and transmission of critical data using ultra reliable low latency communication network architecture, the method comprising:
determining initiation of a real-time request from one or more channels to one or more receiving applications, wherein the real-time request comprises authorization headers, tokens, and authentication headers;
determining that the real-time request does not comprise a criticality header;
dynamically generating the criticality header for the real-time request based on one or more contextual factors associated with the real-time request;
embedding the criticality header into the real-time request with the authorization headers, the tokens, and the authentication headers;
determining if the real-time request is eligible for transmission via an ultra-reliable low latency communication network; and
transmitting the real-time request to a cluster of servers associated with the one or more receiving applications based on determining if the real-time request is eligible for transmission via an ultra-reliable low latency communication network.

16. The computerized method according to claim 15, wherein the method comprises:
determining that the real-time request is eligible for transmission via the ultra-reliable low latency communication network; and
transmitting the real-time request via the ultra-reliable low latency communication network.

17. The computerized method according to claim 15, wherein the method comprises:
determining that the real-time request is not eligible for transmission via the ultra-reliable low latency communication network; and
transmitting the real-time request via a standard entity network comprising a standard replication and transmission mechanism.

18. The computerized method according to claim 15, wherein the cluster of servers comprise active cluster of servers.

19. The computerized method according to claim 15, wherein the cluster of servers comprise active cluster of servers and inactive cluster of servers, wherein the inactive cluster of servers are back up servers to the active cluster of servers.

20. The computerized method according to claim 15, wherein the method comprises:
determining that the real-time request comprises the criticality header; and
processing the real-time request based on the criticality header.

* * * * *